(12) United States Patent
Mueller et al.

(10) Patent No.: US 8,010,392 B2
(45) Date of Patent: Aug. 30, 2011

(54) SYSTEM AND METHOD FOR RETROACTIVE, DYNAMIC MONITORING OF LOW LAYOUT HEIGHTS IN DANGEROUS EVENTS

(75) Inventors: Ralf Mueller, Munich (DE); Michael Buser, Ottobrunn (DE); Ludwig Keller, Markt Schwaben (DE); Grazyna Saganowska, Warsaw (PL); Michael Stengle, Munich (DE)

(73) Assignee: Swiss Reinsurance Company, Zurich (CH)

( * ) Notice: Subject to any disclaimer, the term of this patent is extended or adjusted under 35 U.S.C. 154(b) by 302 days.

(21) Appl. No.: 11/996,080

(22) PCT Filed: Jul. 19, 2005

(86) PCT No.: PCT/CH2005/000425
§ 371 (c)(1),
(2), (4) Date: Oct. 20, 2008

(87) PCT Pub. No.: WO2007/009268
PCT Pub. Date: Jan. 25, 2007

(65) Prior Publication Data
US 2009/0083059 A1    Mar. 26, 2009

(51) Int. Cl.
*G06Q 40/00* (2006.01)
(52) U.S. Cl. .............................. 705/4; 705/35
(58) Field of Classification Search ................ 705/1, 10, 705/4
See application file for complete search history.

(56) References Cited

U.S. PATENT DOCUMENTS

| | | | |
|---|---|---|---|
| 2004/0153362 A1* | 8/2004 | Bauer et al. ..................... | 705/10 |
| 2005/0055248 A1 | 3/2005 | Helitzer et al. | |

FOREIGN PATENT DOCUMENTS

| | | |
|---|---|---|
| EP | 1 457 884 | 9/2004 |
| WO | 00 70513 | 11/2000 |
| WO | 2005 098688 | 10/2005 |

OTHER PUBLICATIONS

Laird et al ("A strategy for advanced condition based maintenance of large generators," Electrical Insulation Conference and Electrical Manufacturing & Coil Winding Technology Conference, 2003. Issue, Sep. 23-25, 2003 pp. 463-468).*

Hoof, Martin et al.,"A Strategy for Advanced Condition Based Maintenance of Large Generators", Electrical Insulation Conference and Electrical Manufacturing & Coil Winding Technology Conference, pp. 463-468 (2003).

* cited by examiner

*Primary Examiner* — Ojo O Oyebisi
(74) *Attorney, Agent, or Firm* — Oblon, Spivak, McClelland, Maier & Neustadt, L.L.P.

(57) ABSTRACT

A system and method for retroactive, dynamic determination, and monitoring of collateralization levels of technical installations to aggregate and analyze measured data and to activate financial assets, including dynamically determining a configuration based on acquired data specific to a mode of operation, the configuration being stored with an assignment to the corresponding mode of operation via a lookup table, performing an aggregation and an analysis of operation-specific-measured-data via the network, the operation-specific-measured-data being assigned by the lookup table to at least one specific parameter to determine corresponding collateralization levels by the statistical analysis module on the basis of the operation-specific-measured-data, and dynamically adapting the corresponding collateralization levels on the basis of at least one of a request and a determinable time interval by the monitoring unit and activating the financial assets to increase the collateralization levels, in response to exceeding a definable deviation value relative to the operation-specific-measured-data.

14 Claims, 6 Drawing Sheets

SYSTEM AND METHOD FOR RETROACTIVE, DYNAMIC MONITORING OF LOW LAYOUT HEIGHTS IN DANGEROUS EVENTS

FIELD

The present invention relates to a system and method for retroactive, dynamic determination, adaptation and/or monitoring of collateralization levels of technical installations. In particular, access-controlled operation-specific data are acquired thereby unidirectionally and/or bidirectionally from source databases, processed and transmitted to appropriate activation modules.

BACKGROUND

The frequent occurrence of natural and environmental catastrophes (earthquakes, floods, cyclones, aridity/drought, fire catastrophes, etc), war and terror events and associated instability of the financial markets (stock market crashes, etc) have imparted previously unknown importance to risk management and corresponding measures for handling such risk events and catastrophes in recent years for general economic activity, since a high proportion of business volume and a considerable percentage of jobs can be endangered thereby. Particularly in the insurance/reinsurance sector, there has been a long-known backlog in technical automation in many areas. The appearance of the World Wide Web and the resulting possibility of being able to access enormous, decentralized quantities of data have created completely new requirements for industry. The survival of an entire branch of industry may depend, for example, on being able to analyze the relevant data rapidly and reliably in order to be able to take the appropriate measures. This is no longer possible based on human work alone but requires a great deal of automation. This type of automation has an extremely important role for industry and society, for example even in areas with traditionally less technical character, such as the insurance industry, at the present time (when at the same time technical progress is associated with an unavoidable increase in risks and a change in the liability concepts within the definition of third party liability). In Europe, the introduction of the Euro has furthermore inevitably brought new developments which result in greater transparency, facilitate cross-border comparison and the conclusion of cross-border contracts. Because of this, too new possibilities for comparison and automation have resulted which is completely utilized from the prior art up to today only in a few areas.

In industry, for expedient risk management for surviving risks, it is essential to know or to be able to estimate, as a boundary condition parameter, a reacquisition value (monetary replacement value) in a country-specific manner in order to be able to determine the necessary capital collateralization levels. With the means known in the prior art, values can only be obtained with considerable uncertainty for the overall risk sum (for example for determining the total insurance sum). This is true not only for industrial plants in so-called developing or emerging countries but also for plants in industrially highly developed countries, such as, for example, Germany, Austria, Italy, Switzerland etc. One of the possible problems is that the company or the object has only an insufficient capital collateralization level for surviving the risk event or is underinsured so that reprocurement is not possible in the event of loss. A further problem with the prior art is that it provides no system or method covering a branch of industry in order to be able to determine such collateralization levels. In other words, coarse estimates or "rules of thumb" are generally used, which can scarcely be automated and with which it is difficult to determine the errors and uncertainties in the calculations. Thus, a considerable uncertainty or inaccuracy with regard to errors always remains in the prior art. A further disadvantage is that technical automation is scarcely possible in the prior art owing to the nonuniform and/or complicated methods. As a result of this, the systems of the prior art do not permit effective dynamic monitoring. The outlay in employee time, costs and material are therefore correspondingly high.

SUMMARY

It is an object of the present invention to propose a novel system and method which reacts dynamically to changed market conditions, dynamically determines collateralization levels and can be used for corresponding control functions, in particular does not have the abovementioned disadvantages.

According to the present invention, these aims are achieved in particular by the elements of the independent claims. Further advantageous embodiments are also evident from the dependent claims and the description.

In particular, these aims are achieved by the invention in that, for the retroactive, dynamic determination and/or monitoring of collateralization levels of technical installations, measured data can be aggregated and analyzed and operation-specific system means can be activated, in that, by means of a filter unit for different modes of operation, in each case a configuration based on registered data specific to the mode of operation can be dynamically determined and, via a lookup table, can be stored in a manner coordinated with the corresponding mode of operation, the filter unit comprising a network interface for access to network nodes connected to source databases via a network for registering data specific to the mode of operation, in that the system comprises a statistical analysis module having an interface for aggregation and analysis of operation-specific measured data via the network, which measured data can be assigned to at least one specific parameter by means of the lookup table, it being possible to determine corresponding collateralization levels by means of the analysis module on the basis of the cumulative operation-specific measured data, in that the system comprises a control unit having an interface, it being possible to dynamically adapt the corresponding collateralization level on the basis of a request and/or a determinable time interval by means of the control unit and/or, in the event of exceeding a definable deviation value, relative to already stored measured data, operation-specific system means can be activated. It has, inter alia, the advantage that the system and method permit for the first time true automation of the monitoring and/or adaptation of collateralization levels in technical installations. At the same time, the invention results in a substantial advantage with regard to cost, time and personnel outlay. With the systems and methods of the prior art, it was in any case scarcely possible to date dynamically to register such data quantities at all since, for example in the case of a static configuration, new cost-relevant parameters are not registered, which can lead a false weighting of the others.

With the systems of the prior art, it was also impossible to specify reliable error limits or inaccuracy intervals. As shown in particular in FIG. 3, the statically chosen dependencies of the prior art lead to completely false results in many areas of industry. Owing to the great variability and adaptability of the system, it is furthermore possible to integrate user requirements in a simple manner. This also arises from the uniform framework of the system for all areas without this leading to falsification of the results in the invention as in the prior art.

In one variant, the filter unit comprises at least one definable threshold value, the relevant parameters being capable of being filtered and of being stored with assignment to a respective mode of operation by means of a comparison module on the basis of the at least one threshold value and the registered data specific to the mode of operation. This variant has, inter alia, the advantage that the fineness of the configuration can be automatically limited without relevant parameters being "lost". In particular, the error can thus simply be propagated to the results In another variant, the filter unit comprises a weighting module by means of which the parameters can be standardized and can be mutually weighted by means of corresponding weighting factors, the weighting factors being stored with assignment to the parameters. This variant has, inter alia, the advantage that the configuration can be generalized and can thus also be simply integrated into any desired other systems and applications.

In a further variant, the weighting by means of the weighting module is dynamically based on the data specific to the mode of operation, the weighting of the filter unit being updatable periodically and/or on request. This variant has, inter alia, the advantage that the system takes into account dynamically (e.g. in realtime) changed conditions, for example market, social or material cost conditions, etc. This was by no means possible in the prior art until now.

In one variant, the weighting module comprises weighted country indices, the weighted country indices being capable of being generated in a country-specific manner by means of the weighting module on the basis of localized databases. This variant has, inter alia, the advantage that country-specific dependencies are effectively permitted for the first time by the country-specific configuration, in particular by a central system.

In yet another variant, the configuration can be determined in a country-specific manner based on country-specific databases. This variant has, inter alia, advantages similar to the preceding one. Only by means of this variant is it possible to achieve a correct country-specific weighting of the parameters, which was likewise not possible in the prior art until now. By means of the central country-specific and/or mode-specific monitoring of the collateralization levels, an effective country- and/or region-dependent comparison is also possible for the first time, which gives rise to new possibilities for an automated dynamic risk estimation.

Below, an embodiment of the present invention is described with reference to an example. The example of the embodiment is illustrated by the attached FIGS. 1 to 6.

DESCRIPTION OF THE DRAWINGS

FIG. 2 shows, by way of example, a first possible characterization of the sequence of operation in power stations, based on which the configuration 30 is dynamically generated. Reference numeral 1 indicates the raw material input, the untreated anthracite or brown coal, 2 represents the installations for treating the coal, 3 represents the process step of steam generation in the boiler installations, 4 represents the process step for conversion of thermal energy into initially rotational energy (turbine) and subsequently into electrical energy (generator), 5 and 6 indicate the water circulation in the process, 5 represents the installations for cooling process water (e.g. cooling towers), 6 represents the pre-treatment of service water for use as process water (water treatment), 7 represents the flue gases produced by the coal firing and 8 represents the installations for flue gas purification (dedusting, desulphurization, removal of oxides of nitrogen, etc) and 9 indicates the electrical units which, depending on operation are present in the installation area of a power station (monitoring and control units, monitoring systems, transformers, substations, etc).

DETAILED DESCRIPTION

Figure 1:
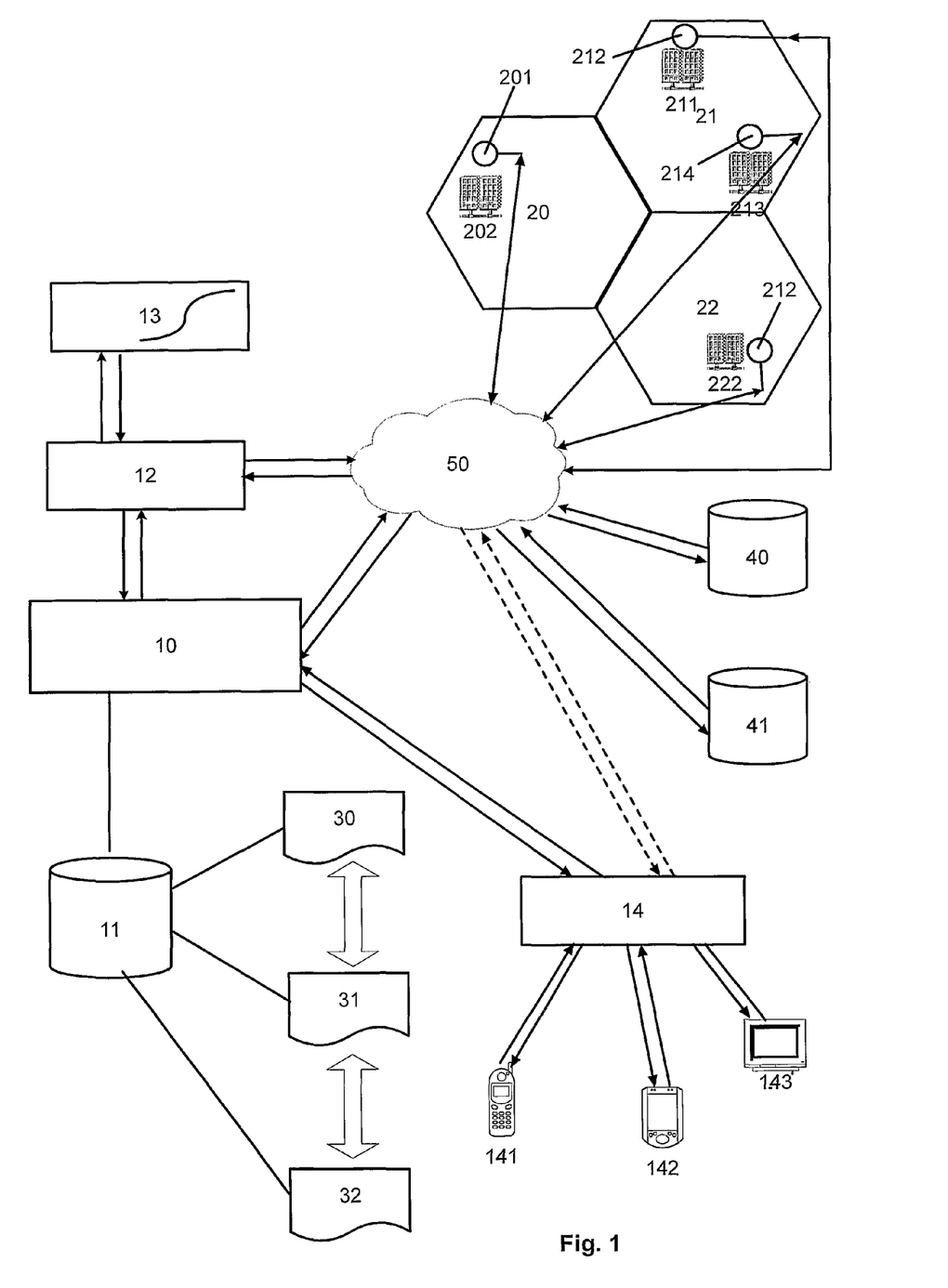
FIG. 1 shows a schematic block diagram of a system for retroactive, dynamic determination and/or monitoring of collateralization levels of technical installations 201, 211, 221, it being possible to aggregate and analyze measured data and to activate operation-specific system means 202, 212, 222.

FIG. 1 schematically illustrates an architecture which can be used for realizing the invention. In this working example, measured data are aggregated and analyzed for retroactive, dynamic determination and/or monitoring of collateralization levels of technical installations 201, 211, 221. By means of a filter unit 12, in each case a configuration 30 based on acquired data specific to the mode of operation is determined for different modes of operation. The data can be aggregated, for example, via a communication unit of the filter unit from local and/or decentralized databases via a network. For example, an extraction module can analyze the content of the data and store the filtered data and/or metadata generated from the data via a lookup table with assignment to the corresponding mode of operation or aggregate said filter data or metadata in a manner specific to the mode of operation. According to the present invention, the filter unit 12 is connected bidirectionally or unidirectionally to the source database or the source databases 40, 41 by means of a network interface via a communication network. The source databases 40, 41 can be linked to the network 50 via one or more network nodes. The communication network 50 comprises, for example, a GSM or a UMTS network or satellite-based mobile radio network and/or one or more fixed networks, for example the public switched telephone network, the Worldwide Internet or a suitable LAN (local area network) or WAN (wide area network). In particular, it also comprises ISDN and XDSL connections. Data are to be understood as meaning, inter alia, also multimedia data, such as digital data, such as texts, graphics, images, maps, animations, moving pictures, video, quicktime, audio recordings, programmes (software), programme-accompanying data and hyperlinks or references to multimedia data. These also include, for example, MPx (MP3) or MPEGx (MPEG4 or 7) standards, as defined by the Moving Picture Experts Group. As mentioned, the data can be stored at various locations in different networks or locally so as to be accessible to the filter unit 12. The last-mentioned networks may comprise, for example, an LAN (local area network) or a WAN (Wide Area Network), the Internet, broadcast cable networks, PSTN, PLMN or the like. The data and/or metadata can be extracted by a content-based indexing technique and may comprise key words, synonyms, references to multimedia data (for example also hyperlinks), image sequences and/or audio sequences, etc. Such systems are known in a very wide range of variations in the prior art. Examples of these are U.S. Pat. No. 5,414,644, which describes a three-file indexing technique, or U.S. Pat. No. 5,210,868, which also stores synonyms as such keywords in the indexing of the multimedia data and extraction of the metadata. In the present working example, the data and/or metadata can, however, also be at least partly dynamically generated (in real time) on the basis of mode-specific data of a mode profile. This has, for example, the advantage that the data and/or metadata always have the topicality and accuracy expedient for the system. The configuration can be effected, for example, by setting technical relevance in the process and/or monetary threshold values, such as, for example, cost relevance ((local) material costs, employee costs, transport costs, availability of technically qualified personnel and/or specialists, etc) for the cost collateralization level for reconstruction. For power stations, for example, a configuration could arise in terms of buildings (size, type of use, construction, etc), energy type (anthracite, brown coal, coke, etc), boiler units, turbines, generators, flue gas purification (dedusting, desulphurization, removal of oxides of nitrogen, etc), auxiliary and secondary systems (hydrogen generation, fuel treatment, storage areas, etc).

Figure 2:
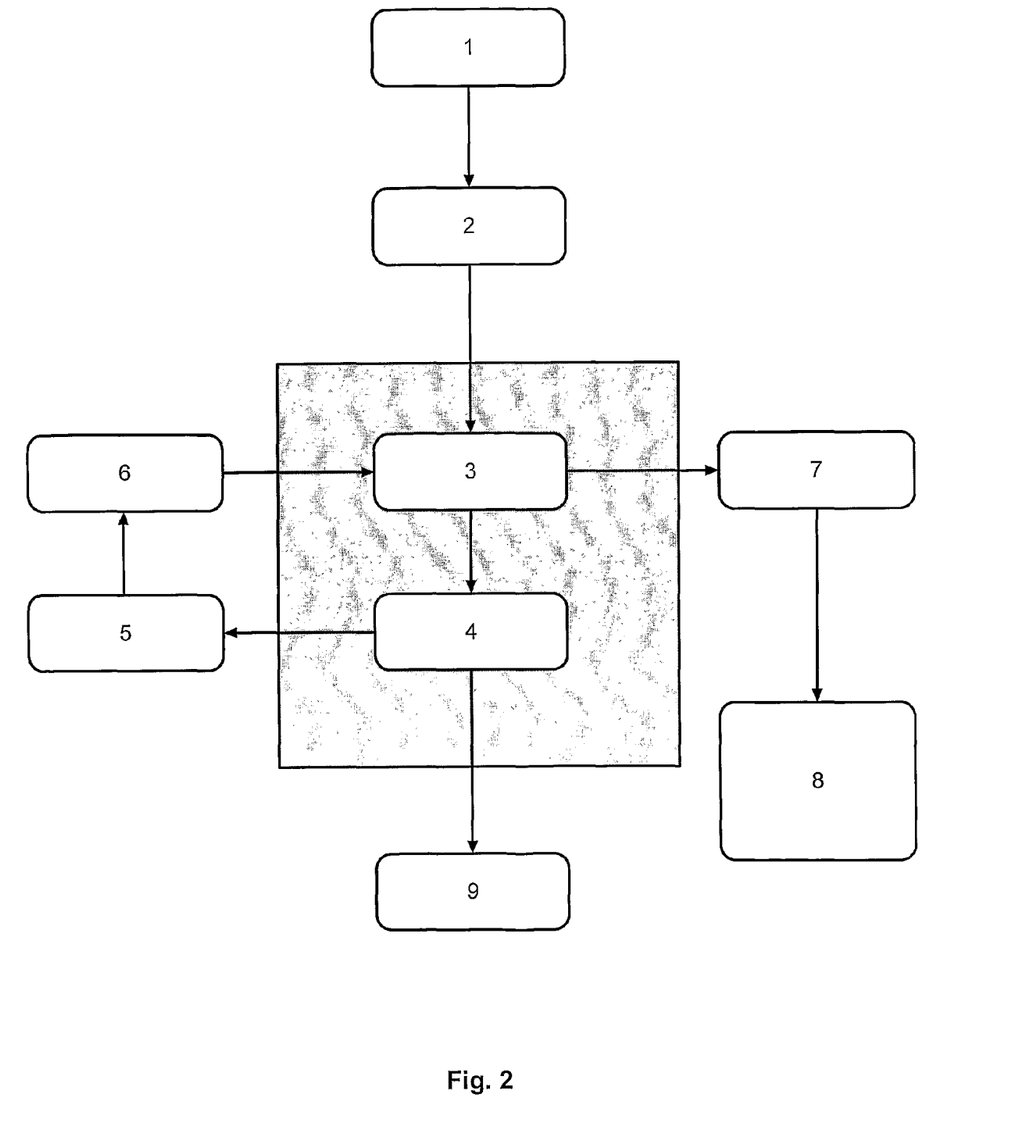

FIG. 2 shows, by way of example, a first possible characterization of the operating sequence in power stations, based on which the configuration 30 is dynamically generated. Reference numeral 1 indicates the raw material input, the untreated anthracite or brown coal, 2 represents the installations for the treatment of the coal, 3 represents the process step of steam generation in the boiler units, 4 represents the process step of conversion of thermal energy into initially rotational energy (turbine) and subsequently into electrical energy (generator), 5 and 6 indicate the water circulation in the process, 5 represents installations for cooling process water (e.g. cooling towers), 6 represents the pre-treatment of service water for use as process water (water treatment), 7 represents the flue gases produced by the coal firing and 8 represents the installations for flue gas purification (dedusting, desulphurization, removal of oxides of nitrogen, etc) and 9 indicates the electrical aggregates which are present in the installation area of a power station depending on operation (monitoring and control units, monitoring systems, transformers, substations, etc).

Figure 6:
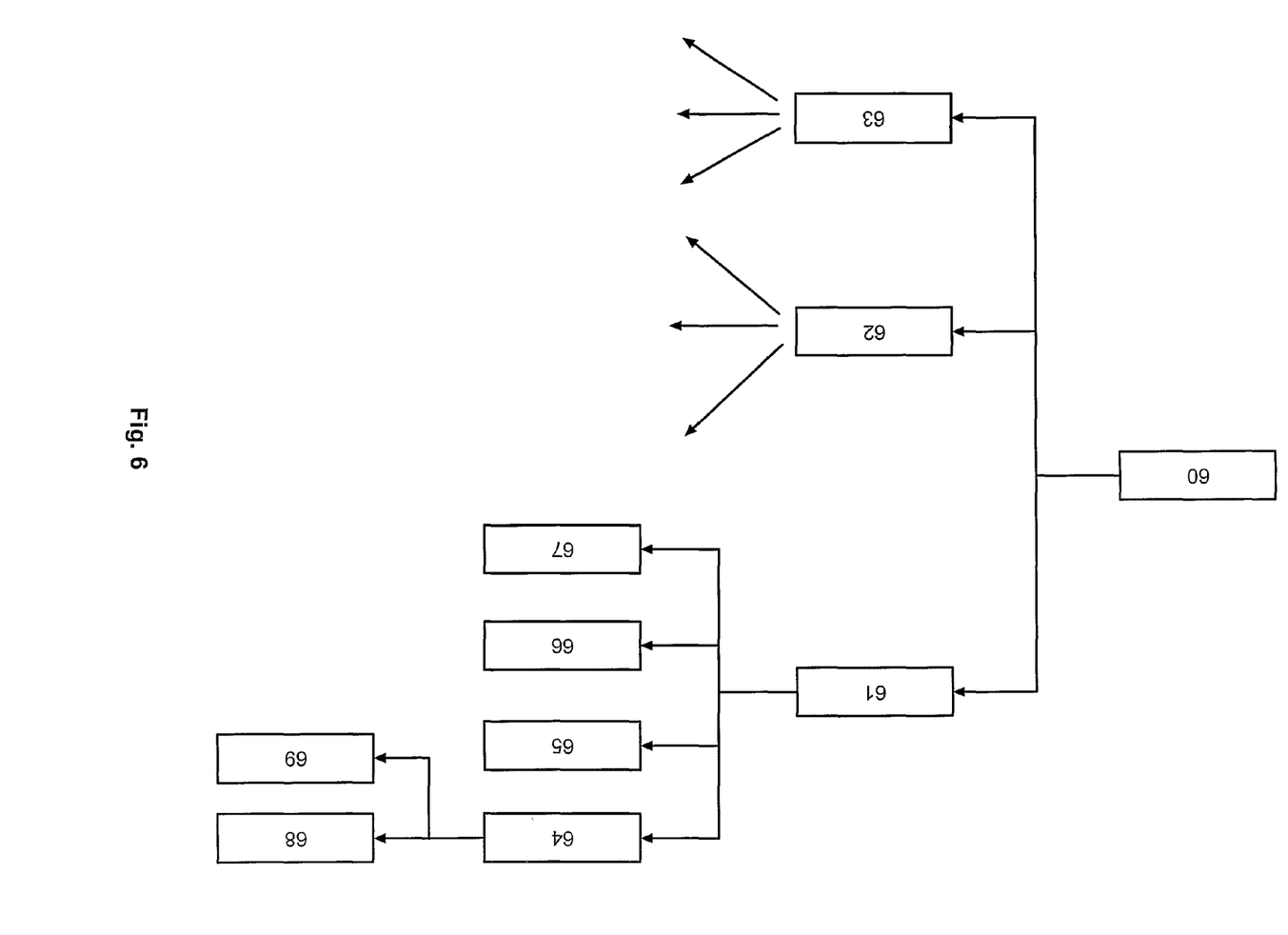
FIG. 6 illustrates a possible configuration 30 by means of a system according to the invention for power stations.

FIG. 6 illustrates a possible configuration 30 by means of the system for power stations. Reference numeral 60 relates to the power station as a whole, in this case a coal-fired power station. This can be configured, for example, in terms of buildings 61, process installations 62 and secondary systems 63. The buildings 61 can be further configured, for example, in terms of machine buildings 64, office buildings 65, storage buildings 66 and auxiliary buildings 67. Finally, for example, the machine building 64 can be divided, for example, into reinforced steel construction 68 or into pure steel construction 69. The process installations 62 can be configured, for example, in terms of boiler units and turbo generators, the turbo generators and the boiler units being capable of being divided into the corresponding individual aggregates. The auxiliary devices 63 can be configured, for example, in terms of flue gas purification, electrical systems, water systems and auxiliary systems. The flue gas purification can furthermore be divided, for example, into dedusting, desulphurization and removal of oxides of nitrogen. The water systems can be further configured, for example, in terms of water cooling and water treatment, the electrical system in terms of monitoring and control installations, monitoring units, transformers, substations and cabling, and the secondary systems in terms of hydrogen generation, fuel treatment and storage areas. The individual parameters make it possible, for example, to perform exact cost calculations.

Both the cost calculations of the individual parameters and the configuration itself can be effected dynamically by the system on the basis of the aggregated data, depending on the variant. As mentioned, the configurations may be locally dependent on the location of the installation. As a variant, the system can adapt the configuration dynamically or statically to different regions. Thus, the average costs for building laborers (wage costs) in central and Eastern Europe (for example in the Czech Republic or Poland) differ fundamentally from those of Western European Industrial Countries (such as Germany or Switzerland). The differences are not to be regarded as static but are subject to more or less strong variations and adaptation trends variable as a function of time (inflation, economic development, etc). This has a direct effect on the collateralization levels. Without an automated system which can recognize and can independently choose such different configurations, an expedient determination of collateralization levels was therefore scarcely possible.

Figure 3:
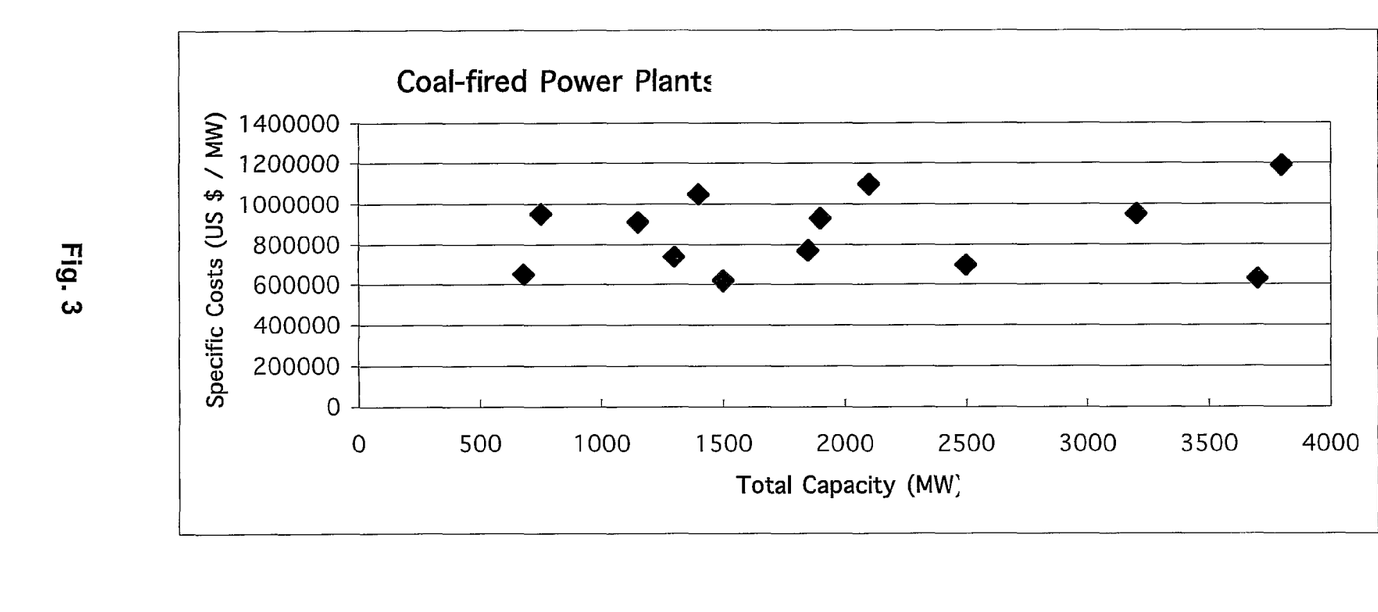
FIG. 3 illustrates the internationally customary method according to the prior art, the collateralization levels, for example in the case of coal-fired power stations, being determined solely on the basis of the total capacity of a power station (power in MW).
Figure 4:
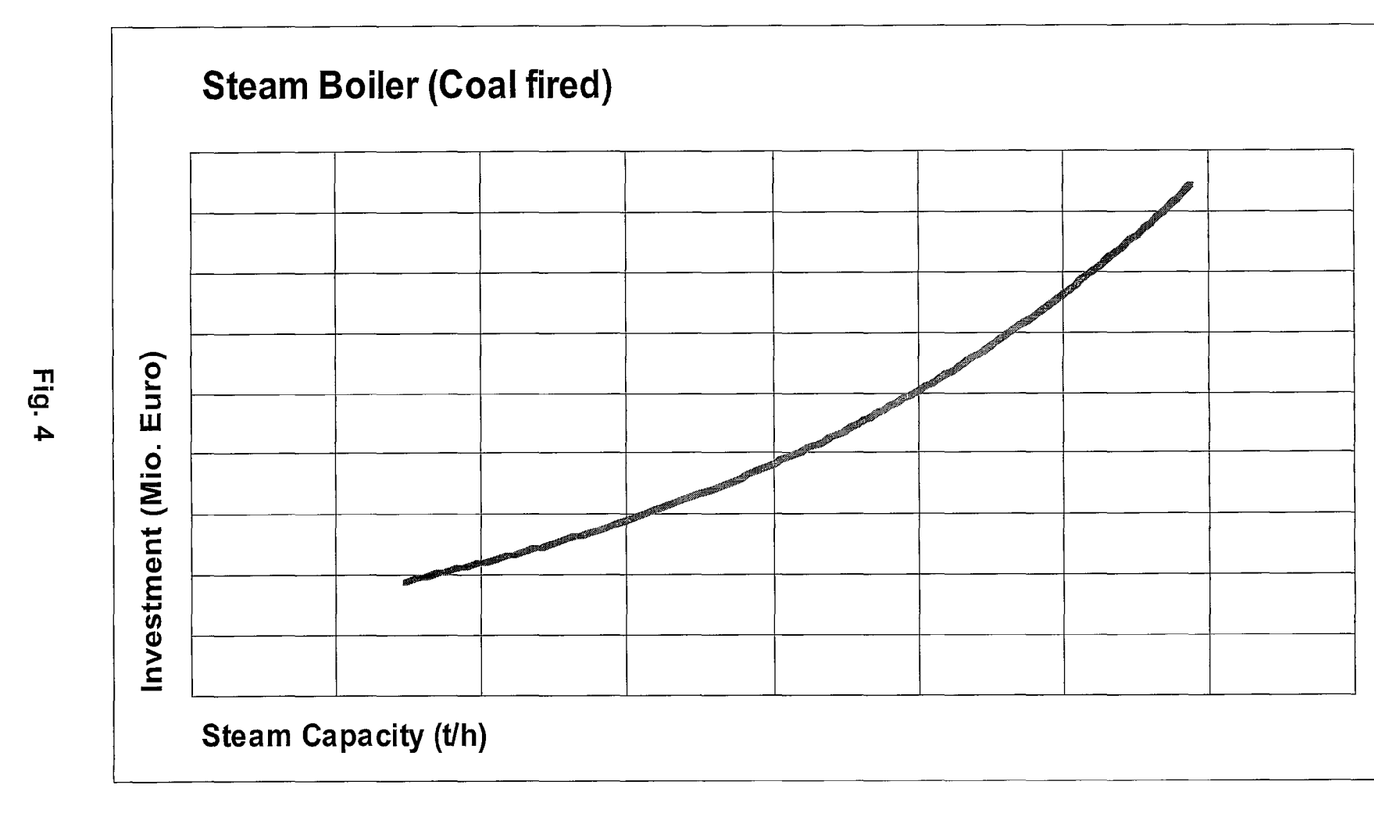
FIG. 4 qualitatively shows the cost trend for steam boilers in coal-fired power stations as a function of the plant capacity (steam output in t/h).
Figure 5:
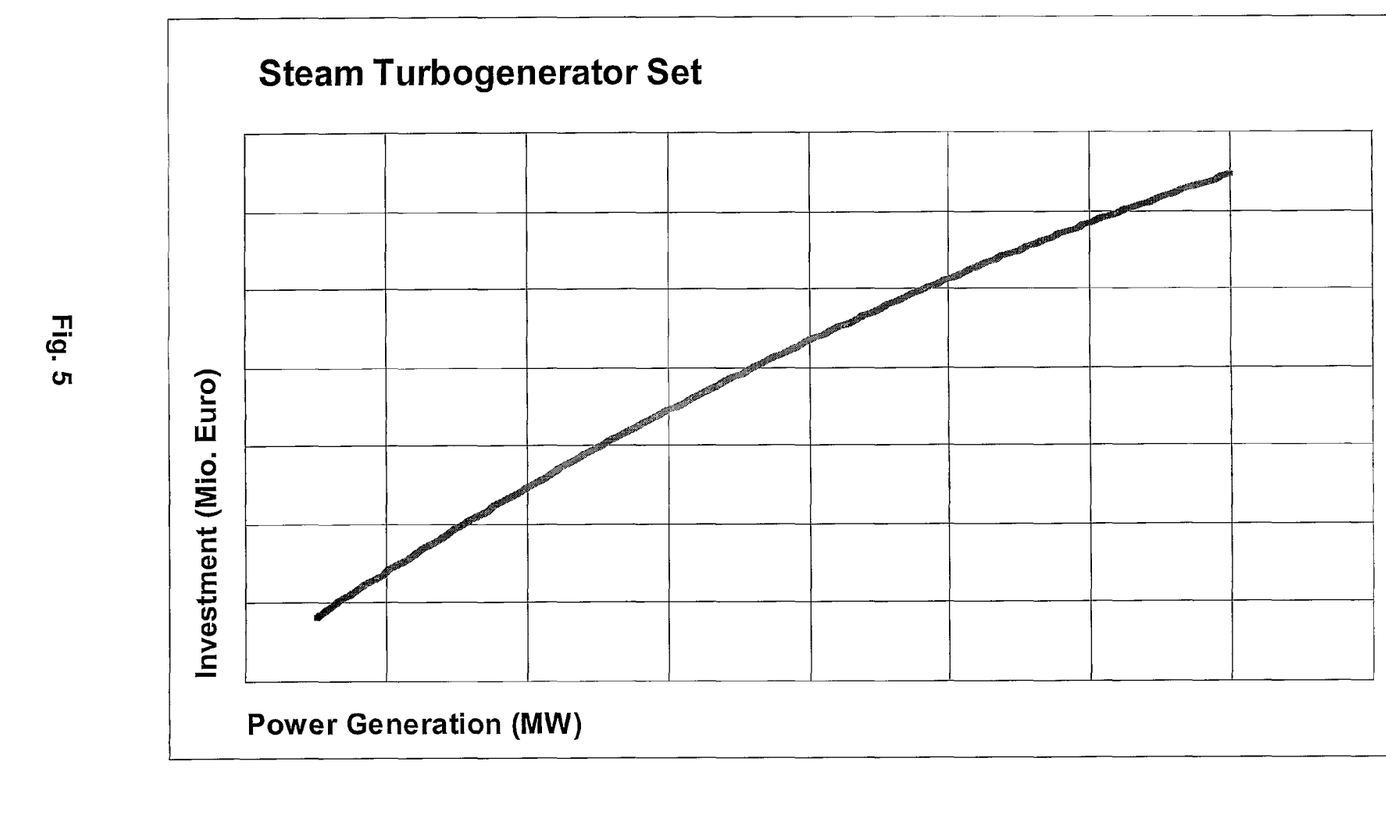
FIG. 5 qualitatively shows the cost trend for turbo generators as a function of the plant capacity (power in MW).

As shown in FIGS. 4 and 5, there is in fact a dependence of the costs for boiler units and the steam capacity (t/h) and, for example, the costs for turbogenerators and the power (MW) in the case of coal-fired power stations. This dependence could to a first approximation perhaps be considered to be linear. FIG. 3 on the other hand shows that, for example in the case of coal-fired power stations, the collateralization levels based on the power of the power stations is not quite correctly reproduced (or not reproduced with the required accuracy) by the internationally customary method according to the prior art, since the collateralization levels are critically dependent on parameters other than just the power of the power stations (or plant capacity). The determination of the correct configuration is, however, by no means trivial. Only a system that can take into account dynamically market-related mode-specific and regional properties provides the possibility for an effective monitoring system For combined heat and power stations, configuration quantities similar to those in the case of coal-fired power stations could result. For breweries, for example, a configuration based on buildings (size, type of use, type of construction, etc), processing zones (tanks, pipes, filtration installations and filling into bottles or drums, etc) and malt production, etc could result.

The system comprises a statistical analysis module 10 having an interface for aggregation and analysis of operation-specific measured data 31 via the network 50. The measured data 31 can be assigned to at least one specific parameter 30 by means of the lookup table. In analogy to the filter unit 12, the measured data can be aggregated, for example, via a communication unit of the analysis module 10 from local and/or decentralized databases via a network. For example, an extraction module can analyze the content of the data and store the filtered data and/or metadata generated from the measured data via a lookup table with assignment to the corresponding operation or can aggregate said filtered data or metadata in an operation-specific manner. According to the present invention, the analysis module 10 is connected bidirectionally or unidirectionally to the database or the databases by means of a network interface via a communication network. The measured data can be transmitted, for example, on request or by the push method. The databases can be connected to the network 50 via one or more network nodes. The communication network 50 comprises, for example, a GSM or UMTS network or satellite-based mobile radio network and/or one or more fixed networks, for example the public switched telephone network, the Worldwide Internet or a suitable LAN (local area network) or WAN (wide area network). In particular, it also comprises ISDN and XDSL connections. Data are to be understood as meaning, inter alia, also multimedia data, such as digital data, such as texts, graphics, images, maps, animations, moving pictures, video, quicktime, audio recordings, programmes (software), programme-accompanying data and hyperlinks or references to multimedia data. These include, for example, MPx (MP3) or MPEGx (MPEG4 or 7) standards, as defined by the Moving Picture Experts Group. As mentioned, the measured data can be stored at different locations in different networks or locally so as to be accessible to the analysis module 10. The last-mentioned networks may comprise, for example, an LAN (local area network) or a WAN (wide area network), the Internet, broadcast cable networks, PSTN, PLMN or the like. By means of the analysis module 10, corresponding collateralization levels 32 are determined on the basis of the cumulative operation-specific measured data 31. The collateralization levels 32 can be determined, for example, statistically on the basis of the configuration in a localized manner (for example, specifically for a country, demographically, etc) and may comprise, for example, monetary cost parameters. The system comprises a monitoring unit 14 having an interface, with corresponding collateralization level 32 being dynamically adapted and/or, the event of exceeding a definable deviation value relative to already stored measured data, operation-specific system means 202, 212, 222 being activated based on a request and/or a determinable time interval by means of the monitoring unit 14. The filter unit 12 and/or the analysis module 10 and/or the monitoring unit 14 can be realized in terms of hardware and/or software.

The filter unit 12 may comprise, for example, at least one definable threshold value, the relevant parameters being capable of being filtered and of being stored with assignment to a respective mode of operation by means of a comparison module 13 on the basis of the at least one threshold value and registered data specific to the mode of operation. It may be expedient if the filter unit 12 comprises a weighting module by means of which the parameters can be standardized and can be mutually weighted by means of appropriate weighting factors, the weighting factors being stored with assignment to the parameters. The weighting can be effected by means of the weighting module, for example dynamically or partly dynamically on the basis of the data specific to the mode of operation, the weighting of the filter unit 12 being updated periodically and/or on request. The weighting module may comprise in particular weighted country and/or regional indices, it being possible to generate the weighted country indices by means of the weighting module on the basis of localized databases in a country-specific manner. Here, countries and region are to be understood as meaning, inter alia, any delimitation of geographical areas which is expedient for a different configuration. Thus, it may also be expedient if the configuration 30 is determined according to localized data and/or metadata specific to the mode of operation. These data and/or metadata can be generated or aggregated beforehand, for example, by means of the filter unit 12 and/or the extraction module.

In the case of unidirectional transmission from the source databases 40/41, for example to the filter unit 12, it is possible, for example, to use an ETSI standards mechanism for access-controlled programmes and/or data (services), so-called conditional access, on individual services or service components or a plurality of services or service components (for example, these services and service components may also be audio programmes and/or data (services) in connection with DAB, and video or television programmes and/or data (services) in connection with DVB) in order to ensure access-controlled data transfer. In particular, scrambling/descrambling procedures (encryption/decryption), parameters for signaling and synchronization of conditional access and mechanisms for the control and distribution of entitlements (entitlement data for users) via the transmission of so-called ECM (entitlement checking messages) and EMM (entitlement management messages) via unidirectional broadcast channels (broadcast cable network or air interface) are described in the above mentioned ETSI standards. According to the above mentioned ETSI standards, a conditional access flag and/or a conditional access identifier is used for each of the service components transmitted via broadcast channels, in order to indicate to the broadcast receiver whether the relevant service component uses conditional access mechanisms or not and, if so, which type of mechanisms is used. For service components which are in a controlled access mode and which are designated further above as access-controlled data (access-controlled data transfer), the data of the relevant service component (which may relate to programmes and/or data) are encrypted with a control word, this control word being regularly changed and, in turn encrypted by a session key, being transmitted in the ECM to the broadcast receiver, i.e. for example the interface of the filter unit 12. According to the above mentioned ETSI standards, the so-called access controlled system used for all service components of a service is identified by the conditional access identifier, which access control system can interpret and process the ECM and EMM transmitted by the broadcast transmitter. The session key used for encrypting the control words is stored as secret information in the access controlled system according to the above mentioned ETSI standards. Session keys can be transmitted in EMM to broadcast receivers, said keys in turn being encrypted by a distribution key for the transmission. According to the above mentioned ETSI standards, entitlements (entitlement data) are transmitted to broadcast receivers in the EMM, various types of entitlements which may correspond to various access types being defined.

The invention claimed is:

1. A system for retroactive, dynamic determination, and monitoring of collateralization levels of technical installations to aggregate and analyze measured data and to activate financial assets, the system comprising:
   a filter unit configured to dynamically determine, for different modes of operation, a configuration based on acquired data specific to a mode of operation, the configuration being stored with an assignment to the corresponding mode of operation via a lookup table, the filter unit including a network interface which accesses network nodes connected to source databases via a network, to acquire the data specific to the mode of operation;
   a statistical analysis module configured to perform an aggregation and an analysis of operation-specific measured data via the network, the operation-specific measured data being assigned by the lookup table to at least one specific parameter to determine corresponding collateralization levels by the statistical analysis module on the basis of the operation-specific measured data; and
   a monitoring unit configured to dynamically adapt the corresponding collateralization levels on the basis of at least one of a request and a determinable time interval by the monitoring unit, and to activate the financial assets to increase the collateralization levels, in response to exceeding a definable deviation value relative to the already stored operation-specific measured data.

2. The system according to claim 1, wherein the filter unit includes at least one definable threshold value, and a comparison module,
the comparison module configured to filter and store the at least one specific parameter with the assignment to a respective mode of operation on the basis of the at least one definable threshold value and the acquired data specific to the mode of operation.

3. The system according to claim 1, wherein the filter unit includes a weighting module configured to standardize and weigh the at least one specific parameter using corresponding weighting factors, the weighting factors being stored with a second assignment to the at least one specific parameter.

4. The system according to claim 3, wherein the weighting by the weighting module is dynamically based on the data specific to the mode of operation, and the weighting of the filter unit is updated at least one of periodically and on request.

5. The system according to claim 3, wherein the weighting module includes weighted country indices, the weighted country indices being generated by the weighting module on the basis of localized databases in a country-specific manner.

6. The system according to claim 5, wherein the configuration is determined according to localized data specific to the mode of operation.

7. A method for retroactive, dynamic determination, monitoring of collateralization levels for technical installations by risk events, and aggregating and analyzing measured data, the method comprising:
dynamically determining, for different modes of operation, using a filter unit, a configuration based on acquired data specific to a mode of operation, the configuration being stored with an assignment to the corresponding mode of operation via a lookup table, the filter unit including a network interface which accesses network nodes connected to source databases via a network, to acquire the data specific to the mode of operation;
aggregating and analyzing, by a statistical analysis module, operation-specific measured data via the network, the operation-specific measured data being stored with the assignment to at least one specific parameter by the lookup table, to determine corresponding collateralization levels by the statistical analysis module on the basis of the operation-specific measured data; and
dynamically adapting, using a monitoring unit, the corresponding collateralization levels on the basis of a at least one of a request and a determinable time interval by the monitoring unit, and activating financial assets to increase the collateralization levels in response to exceeding a definable deviation value relative to the already stored operation-specific measured data.

8. The method according to claim 7, wherein the filter unit includes at least one definable threshold value, and a comparison module, the method further comprising:
filtering and storing, using the comparison module, the at least one specific parameter with the assignment to a respective mode of operation on the basis of the at least one threshold value and the acquired data specific to the mode of operation.

9. The method according to claim 7, further comprising:
standardizing and weighting, using a weighting module in the filter unit, the at least one specific parameter using corresponding weighting factors, the weighting factors being stored with a second assignment to the at least one specific parameter.

10. The method according to claim 9, wherein the weighting by the weighting module weights the weighting factors dynamically on the basis of the data specific to the mode of operation, the method further comprising:
updating at least one of periodically and on request, the weighting of the filter unit.

11. The method according to claim 9, further comprising:
generating, by the weighting module, weighted country indices on the basis of localized databases in a country-specific manner.

12. The method according to claim 11, wherein the dynamically determining determines the configuration according to localized data specific to the mode of operation.

13. The method according to claim 7, wherein the configuration corresponds to location, material cost, employee cost, transport cost, availability of technically qualified personnel, size and type of buildings, and energy type.

14. The system according to claim 1, wherein the configuration corresponds to location, material cost, employee cost, transport cost, availability of technically qualified personnel, size and type of buildings, and energy type.

* * * * *